Patented Mar. 11, 1941

2,234,866

UNITED STATES PATENT OFFICE 2,234,866

PYRAZOLONE-SULPHONIC ACIDS AND PROCESS OF MAKING THE SAME

Hans P. Kaufmann, Munster, Westfalen, Germany

No Drawing. Application December 14, 1938, Serial No. 245,803. In Germany December 12, 1936

11 Claims. (Cl. 260—310)

My invention relates to pyrazolone-4-sulphonic acids and a process of making the same.

In the "Berichte der Deutschen Chemischen Gesellschaft," page 1941, vol. 25, Möllenhoff published a communication dealing with sulphonic acids of phenyl-methyl-pyrazolone and its derivatives. By treating it with 4-5 times its amount of concentrated sulphuric acid on the water bath, or at a temperature of 130° C., he obtained compounds in which the phenyl groups contained the sulphuric acid residue. No sulphonation occurred at the 4-position.

One object of my invention is to produce new pyrazolone sulphonic acids by which the sulpho group is attached in the 4-position, and which are well adapted to be used for the manufacture of medicaments, dyestuffs and so on.

Another object of my invention is to show a new process by which the sulphonation of pyrazolone and its derivatives is possible.

Other objects and advantages of my invention will appear in the following description.

I have found that chlor-sulphonic acid acts on pyrazolone in such a way that 4-sulphonic acids are formed. The reaction proceeds still more smoothly if a mixture of acetic acid anhydride and sulphuric acid is used in place of chlor-sulphonic acid, when the 4-sulphonic acids may be obtained with good yields. That the sulpho group is actually attached to the carbon atom in position 4 in the pyrazole ring can be proved by replacing it by other groups to form known substances. Thus, for example, from 1-phenyl-2,3-dimethyl-5-pyrazolone-4-sulphonic acid the known 4-nitro-derivative is formed by treatment with nitric acid.

Pyrazolones sulphonated in the 4-position have hitherto never been described in any literature. The substances described under Nos. 420, 429 and 433 in the "Tabellarischen Übersicht der Pyrazolderivate," Brunswick 1937, by Georg Cohn, are bi-sulphite compounds of 4-keto-5-pyrazolones, for example 1-phenyl-3-methyl-4-keto-5-pyrazolone.

Example 1

17.5 parts of 1-phenyl-3-methyl-5-pyrazolone, 9.5 parts of sulphuric acid and about 30 parts of acetic acid anhydride are caused to react by heating for several hours on a bath of boiling water. The reaction mixture is then cooled and ether is added whereupon an oil separates. If the oil is treated, after decanting the ether, with chloroform and acetone it becomes solid. The snow-white residue is dried at 80° C. It represents 1-phenyl-3-methyl - 5 - pyrazolone-4-sulphonic acid which has no sharply defined melting point. The yield amounts to about 80% of the theoretical.

Example 2

Into a mixture of 15 parts of acetic acid anhydride and 4.76 parts of concentrated sulphuric acid there are introduced, while still hot, 9 parts of 1-phenyl-2, 3-dimethyl-5-pyrazolone. Solution occurs with the evolution of heat. If now the solution is heated on the water bath there is obtained a crystalline paste of 1-phenyl-2,3 - dimethyl - 5 - pyrazolone-4-sulphonic acid. After washing with chloroform and ether a yield of about 85% of the substance is obtained. It melts with partial decomposition at a temperature which is not sharply defined but forms beautiful crystalline salts, for example of calcium and magnesium.

Example 3

15 parts of chlorsulphonic acid are gradually added to 5 parts of 1-phenyl-2,3-dimethyl-5-pyrazolone and the solution obtained is finally heated for a short time on the water bath. It is then poured on to ice and filtered. The substance specified in Example 1 is obtained from the filtrate.

Example 4

10 parts of 1-phenyl-2-ethyl-3-methyl-5-pyrazolone are introduced into a mixture of 16 parts of acetic acid anhydride and 5 parts of concentrated sulphuric acid. After heating on the water bath and subsequent cooling the product is washed with ether, a yield of about 70% of the 4-sulphonic acid being thereby obtained.

Example 5

8.4 parts of 5-pyrazolone are dissolved in 18 parts of acetic acid anhydride and 9.8 parts of concentrated sulphuric acid are introduced while cooling. After the reaction has been brought to completion by finally warming on the water bath the reaction product is first treated with hot toluene, and then subjected to a thorough treatment with ether, whereby the sulphonic acid is obtained as a residue in the form of a viscous mass which gradually solidifies. It is readily soluble in water and alcohol and soluble with difficulty in other organic solvents.

So, while I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

I claim:

1. As a new product a 5-pyrazolone-sulphonic acid in which the sulpho group is attached in the 4-position.

2. As a new product 1-phenyl-3-methyl-5-pyrazolone-4-sulphonic acid.

3. As a new product 1-phenyl-2,3-dimethyl-5-pyrazolone-4-sulphonic acid.

4. As a new product 1-phenyl-2-ethyl-3-methyl-5-pyrazolone-4-sulphonic acid.

5. As a new product the 4-sulphonic acid of a 5-pyrazolone, which is substituted in the 1 and 3 positions.

6. A process for the production of 5-pyrazolone-4-sulphonic acids which comprises causing a 5-pyrazolone which is free from aminophenyl constituents and which corresponds to the formula

wherein X represents a member of the group consisting of H and phenyl, and Y represents a member of the group consisting of H and alkyl to react with a mixture of sulphuric acid and acetic acid anhydride.

7. A process for the production of 5-pyrazolone-4-sulphonic acids which comprises causing a 5-pyrazolone which is free from aminophenyl constituents and which corresponds to the formula

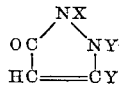

wherein X represents a member of the group consisting of H and phenyl and Y represents a member of the group consisting of H and alkyl to react with chlorosulphonic acid, whereby nuclear sulphonation is effected.

8. A process for the production of 5-pyrazolone-4-sulphonic acids which comprises warming a mixture of a 5-pyrazolone which is free from aminophenyl constituents and which corresponds to the formula

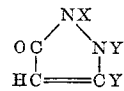

wherein X represents a member of the group consisting of H and phenyl and Y represents a member of the group consisting of H and alkyl, sulphuric acid and acetic acid anhydride, separating the resulting product from the solution, washing it with a solvent insoluble with water and drying the substance thus obtained.

9. As a new product the 4-sulphonic acid of a 5-pyrazolone, which is substituted in the 1, 2 and 3 positions.

10. As a new product the 4-sulphonic acid of a 5-pyrazolone, which is aryl-substituted in the 1 position and is alkyl-substituted in the 2 and 3 positions.

11. A process for the production of 5-pyrazolone-4-sulphonic acids which comprises warming a mixture of a 5-pyrazolone which is free from aminophenyl constituents and which corresponds to the formula

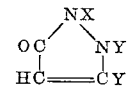

wherein X represents a member of the group consisting of H and phenyl and Y represents a member of the group consisting of H and alkyl with a substantially anhydrous, vigorous sulphonating agent, separating the resultant 4-sulphonic acid from the solution, and washing and drying the substance thus obtained.

HANS P. KAUFMANN.